Feb. 27, 1923.
M. WHITEHEAD
1,446,606
PROCESS AND APPARATUS FOR EXTRACTION OF OILS FROM VEGETABLE MATTER
Filed Apr. 4, 1921
3 sheets-sheet 1
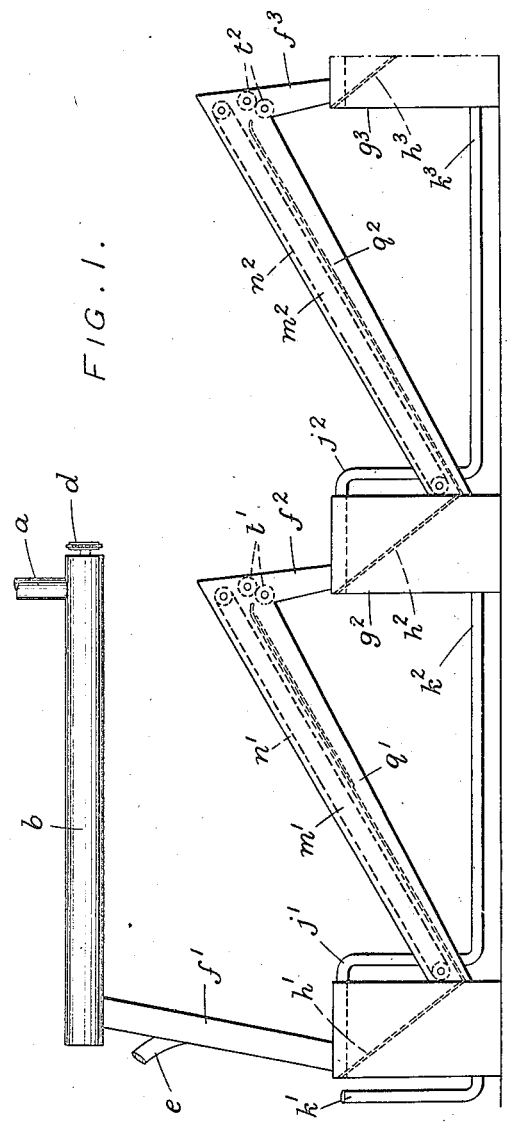
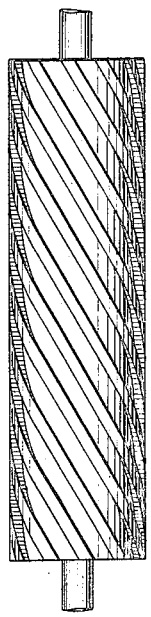
WITNESS
G. V. Rasmussen
INVENTOR
MATTHEW WHITEHEAD
BY
ATTORNEYS

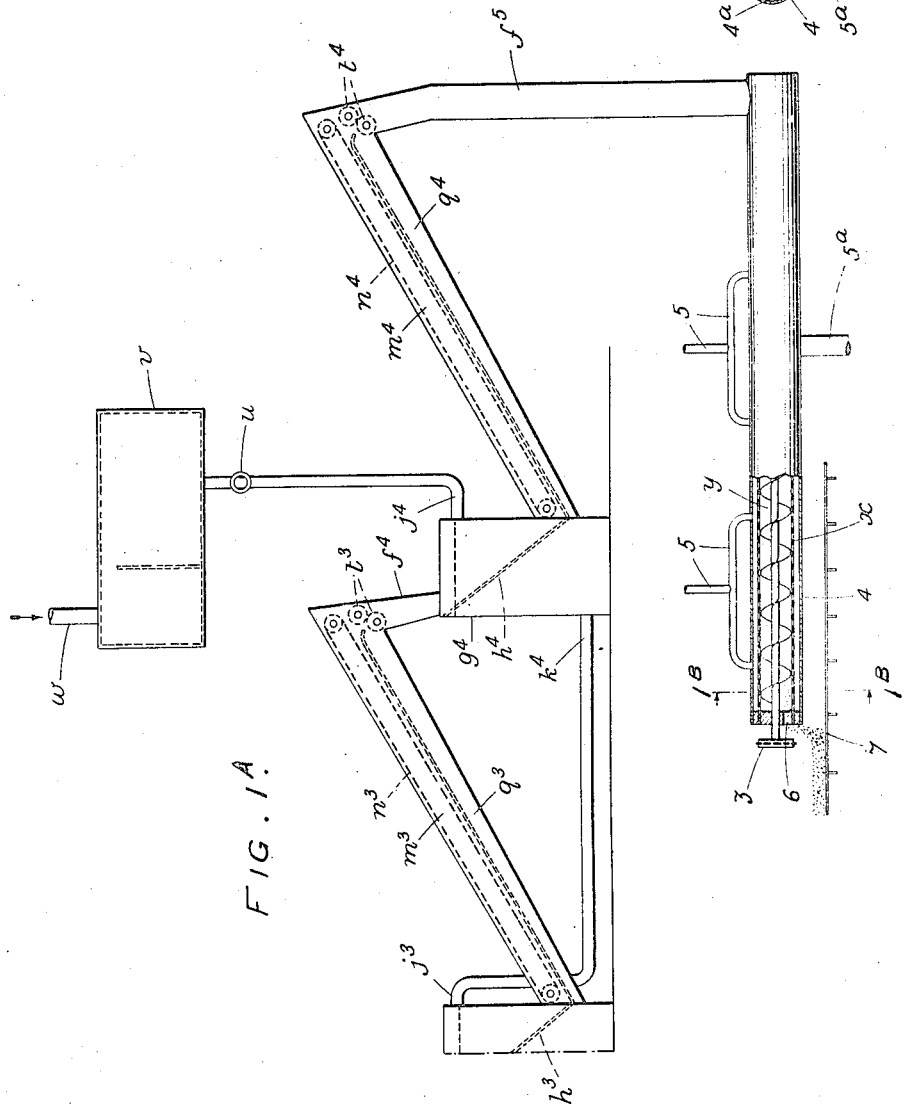

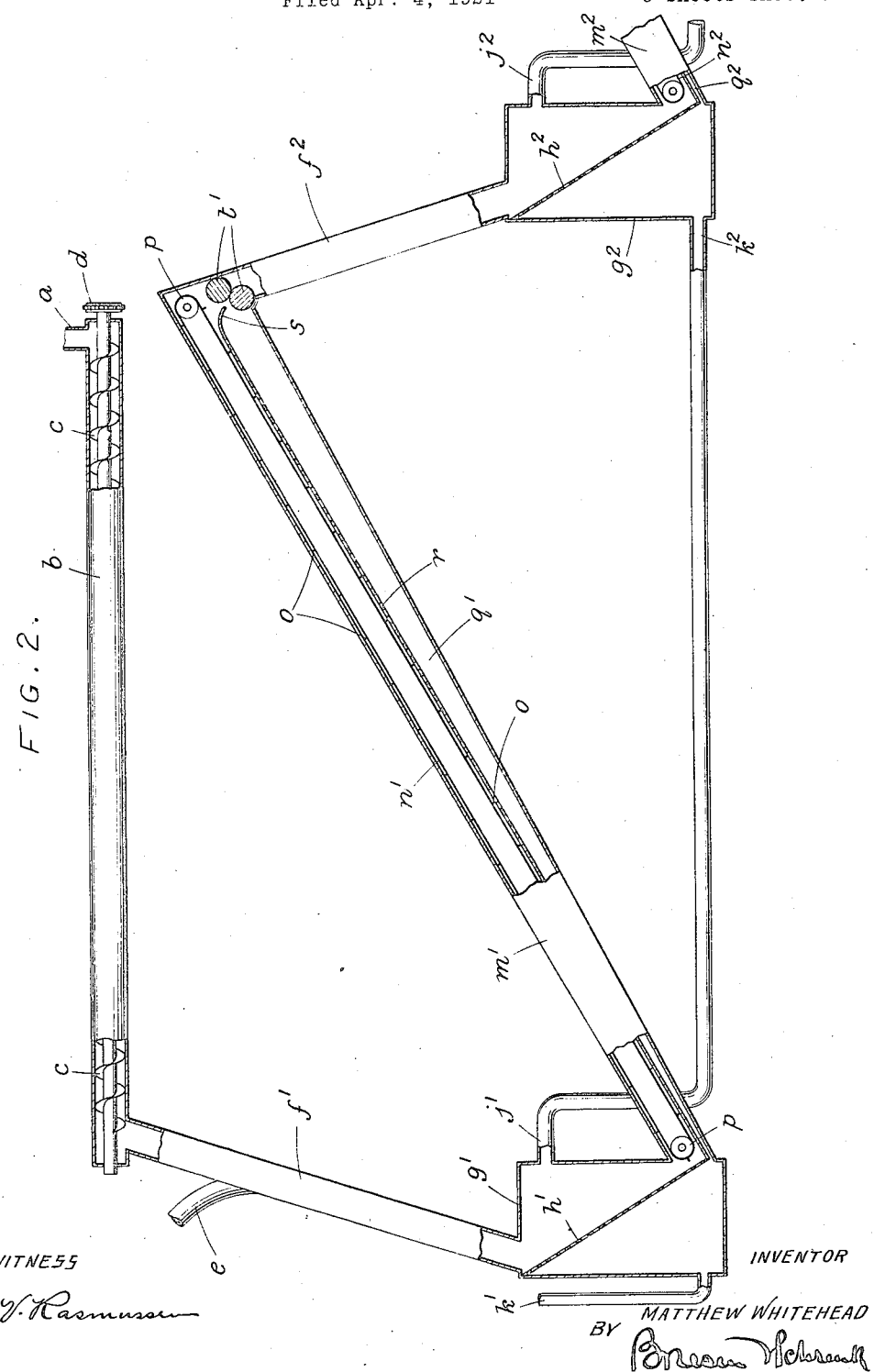

Patented Feb. 27, 1923.

1,446,606

UNITED STATES PATENT OFFICE.

MATTHEW WHITEHEAD, OF KINGSTON-UPON-HULL, ENGLAND, ASSIGNOR OF ONE-HALF TO ERNEST SCOTT, OF KINGSTON-UPON-HULL, ENGLAND.

PROCESS AND APPARATUS FOR EXTRACTION OF OILS FROM VEGETABLE MATTER.

Application filed April 4, 1921. Serial No. 458,490.

*To all whom it may concern:*

Be it known that I, MATTHEW WHITEHEAD, of 134 Stoneferry Road, in the city and county of Kingston-upon-Hull, England, a British subject, have invented certain new and useful Improvements in Processes and Apparatus for Extraction of Oils from Vegetable Matter, of which the following is a specification.

This invention relates to the extraction of oils from crushed seed or other vegetable matter, hereinafter referred to as "meal," which is usually effected by placing the meal in a so-called "pot" which is then filled with spirit in which the meal is allowed to soak, the spirit is then drained off direct to the evaporator by which the spirit is recovered from the oil. The pot is again filled with spirit and the spirit is drained off without allowing the meal to soak and said spirit is pumped back to the pot several times and is then run off into a separate tank known as a mixing tank. The solvent and oil in the mixing tank is then pumped into another pot which contains fresh meal which is allowed to soak and the mixture of solvent and oil is then drained off to the evaporator for recovery and fresh solvent is introduced into said pot and drained off without allowing the meal to soak, and said spirit is pumped back several times to said pot and is then run off into a mixing tank from which it is introduced into a third pot, and so on. This process is a very lengthy one owing to the time occupied by the spirit in soaking through to the centre of the mass and in being drained off therefrom, a delay which is incurred by each soaking so that the aggregate of the time occupied by the spirit in reaching the centre of the mass of meal and in being drained off therefrom is considerably greater than the time occupied by the process proper. The known process has the further disadvantage that the meal must be dug out of the pot after the process is complete thus involving much labour.

For the purpose of degreasing wool and the like it has been proposed to enclose a layer of the material to be treated between a pair of bands of foraminous material such as copper gauze and to pass this compound band alternately through troughs containing the degreasing compound which may consist of spirit, and between pairs of rollers, the degreasing compound being passed continuously from one trough to the next in a direction opposite to that taken by the band, and the wool or similar material after being thus treated being passed between a series of hot rollers and subjected to a blast of hot and dry air for the purpose of removing all traces of spirit or the like.

According to this invention the meal to be treated and the spirit are intimately mixed and moved continuously in opposite directions the speed of movement of both meal and spirit being temporarily retarded at predetermined points at which the meal moves freely through the spirit without the employment of any separate container for said meal, and between which points the meal is submitted to wringing action before passing on to the next point, whilst the mixture of spirit and oil is returned to the point from which the meal has been removed, the meal after leaving the last wringing point being submitted to the action of vapour for removal of spirit, the vapour being drawn off to a condenser forming part of the usual spirit reclaiming plant.

The apparatus for carrying out the process comprises a series of tanks in which the movement of both meal and spirit is temporarily retarded and in which they are intimately mixed each of said tanks being divided into two parts by a screen of foraminous material, means for conducting the meal and the spirit to one side of the screen, to intimately mix them, means for conveying the meal from each tank to wringing apparatus, means for conducting the mixture of spirit and oil expressed from the meal by said wringing apparatus back to said tank, means for conducting the mixture of spirit and oil from beneath the screen in one tank to above the screen in another in the opposite direction to the movement of the meal, and from the last tank (with respect to the movement of said mixture) to an evaporator, means for conveying the meal from the last tank (with respect to the movement of said meal) to a chamber or the like wherein it is submitted to the action of vapour, and means for conducting the spirit-laden vapour to a condenser.

The screens are preferably placed in inclined positions in the tanks, the meal and also the mixture of spirit and oil being introduced into the tanks above said screens so that the meal passes freely through the spirit whilst the mixture expressed by the wringing apparatus is conducted back to below the screen in the tank from which it has been conveyed with the meal. The meal is preferably conveyed away from the bottom of the tanks by endless scraper or like conveyors over screens of foraminous material, through which part of the mixture of spirit and oil drains off from the meal into a conduit before the meal is delivered to the wringing apparatus and the mixture expressed by said apparatus is conducted back to the previous tank by said conduit.

One form of the apparatus is illustrated in the accompanying drawings wherein Figures 1 and $1^A$ constitute together a diagrammatic elevation of the plant, Figure $1^A$ being the right-hand continuation of Figure 1; Figure $1^B$ is detail in vertical section on the line $1^B$—$1^B$ of Figure $1^A$; Figure 2 is a partly sectional elevation of a portion of the plant on a larger scale, and Figure 3 is an elevation of a wringing roller.

For the sake of simplicity the plant is shewn in an extended form and it is to be understood that this arrangement is not essential, it being possible and preferable to reduce the length of the plant as a whole by arranging the parts side by side instead of end to end.

The seed crushed in the usual manner is fed from a source of supply, not shewn, into the inlet $a$ of a conduit $b$ having therein a screw conveyor $c$ provided with a sprocket wheel $d$ driven by any prime mover, not shewn. The conduit $b$ may be steam or water jacketed so that the meal may be heated as it is conveyed therethrough. A pipe $e$ connected with an exhaust pump or the like, not shewn, branches off from the delivery pipe $f^1$ of the conduit $b$ for a purpose hereinafter set forth. The meal falls through the delivery pipe $f^1$ to a tank $g^1$ in which is an obliquely disposed screen $h^1$ of foraminous material such as strong wire guaze and matting above which the meal is delivered into the tank. Also entering the tank $g^1$ near the top thereof and above the screen $h^1$ is an inlet pipe $j^1$ for spirit (or strictly speaking a mixture of spirit and oil as will be more apparent hereinafter) and near the bottom of said tank and below the screen $h^1$ is an outlet pipe $k^1$ for spirit. Opening into the tank $g^1$ near the bottom thereof but above the screen $h^1$ is a conduit $m^1$ in which is disposed a conveyor $n^1$ composed of transverse slats $o$ carried by endless chains passing over pulleys $p$, $p$, and immediately below the conduit $m^1$ is another conduit $q^1$, which however, opens into the tank $g^1$ below the screen $h^1$. Upwards from about the level of the inlet pipe $j^1$ the bottom of the conduit $m^1$ is formed of foraminous material as at $r$ and at its upper end, said bottom terminates in a curved plate $s$ leading towards the junction between a pair of bronze wringing rollers $t^1$, $t^1$, disposed, with their axes lying in a plane slightly inclined to the vertical, above a delivery pipe $f^2$, which, leads to a second tank $g^2$ similar to the tank $g^1$, being provided with an obliquely disposed screen $h^2$, a spirit inlet pipe $j^2$, a spirit outlet pipe $k^2$, a conduit $m^2$ in which is disposed a conveyor $n^2$, a second conduit $q^2$ and wringing rollers $t^2$, $t^2$. The spirit outlet pipe $k^2$ from the tank $g^2$ is connected with the inlet pipe $j^1$ of the tank $g^1$ and similarly the inlet pipe $j^2$ is connected with the outlet pipe $k^3$ of a third tank $g^3$ and so on, the other parts of the plant being repeated and leading from one tank to another as above described. In the plant illustrated four such tanks $g^1$, $g^2$, $g^3$ and $g^4$ and associated parts are depicted, and like parts of each series are indicated by similar reference letters with appropriate indices.

The spirit inlet pipe $j^4$ of the tank $g^4$ is provided with a cock $u$ and is connected with a supply tank $v$ into which is fed through a pipe $w$ spirit from apparatus (not shewn) of known type whereby spirit is reclaimed from the mixture of oil and spirit, additional spirit being added as required. The outlet pipe $k^1$ from the tank $g^1$ is also connected with the reclaiming apparatus.

The last pair of wringing rollers $t^4$, $t^4$ is disposed above a delivery pipe $f^5$ leading to a perforated conduit $x$ in which is disposed a screw conveyor $y$ having a sprocket wheel $z$ whereby it may be driven by a prime mover, said perforated conduit $x$ being surrounded by a casing 4 the annular space between the conduit $x$ and casing 4 being divided by partitions $4^a$ into upper and lower halves into the lower of which steam or vapour is introduced by a pipe $5^a$ so as to pass through the perforated conduit $x$ into the meal therein, the vapour being drawn off through said perforated conduit $x$ into the upper part of the annular space between the casing 4 and the conduit $x$ and thence through pipes 5 to a condenser forming part of the spirit reclaiming plant whilst the meal is discharged through an outlet 6 on to a belt or like conveyor 7.

The general direction of movement of the meal is from the inlet $a$ through the conduit $b$ delivery pipe $f^1$ tank $g^1$ and so on to the outlet 6 of the conduit $x$ whilst the general direction of movement of the spirit is from the tank $v$ through the inlet $j^4$, tank $g^4$, outlet $k^4$ and so on to the outlet $k^1$ and thence through the reclaiming plant, not shewn, back to the tank $v$.

The process is carried out continuously through the several parts of the plant and it will suffice to describe in detail what takes place in the first part.

The crushed seed entering by the inlet $a$ is heated (if desired) in the conduit $b$ and is discharged through the pipe $f^1$ to the top of the tank $g^1$ above the screen $h^1$. Here the movement of the meal is retarded as it gradually descends to near the bottom of the tank but always above the screen $h^1$. During this retarded movement the meal is soaked in the mixture of spirit and oil entering by the inlet $j^1$ which mixture passes through the meal and the screen $h^1$ on its way to the outlet $k^1$ and part of the oil is extracted from said meal. Any vapour (spirit or otherwise) which may collect in the tank $g^1$ through the working of the plant is removed through the pipe $e$. The meal near the bottom of the tank $g^1$ is conveyed away by the conveyor $n^1$ in the conduit $m^1$ and as it passes over the screen $r$ some of the mixture of spirit and oil drains therefrom and flows back to beneath the screen $h^1$ in the tank $g^1$ by way of the conduit $q^1$. The conveyor $n^1$ delivers the meal to the wringing rollers $t^1$, $t^1$ whereby the mixture of spirit and oil is expressed therefrom, said mixture being returned to the tank $q^1$ by way of the conduit $q^1$ whilst the meal is delivered by the pipe $f^2$ to the tank $g^2$ where its movement is again retarded and where it is again soaked, and so on to the last wringing rollers $t^4$, $t^4$. As the spirit moves through the plant in the opposite direction to the meal it follows that the fresh meal which contains the most oil is soaked in a mixture of spirit and oil in which there is a large proportion of oil whilst the meal from which most of the oil has been extracted is soaked in fresh spirit so that the extraction process is progressive and is practically continuous whilst the arrangement of the conduits and wringing rollers ensures that the mixture of spirit and oil is delivered to the appropriate tank according to the proportion of oil therein and that as little as possible of the mixture is carried into a tank in which the proportion of oil is less.

The wringing rollers are formed with helically fluted surfaces as indicated in Figure 3, the fluting of the one roller of a pair mating with the fluting of the other and the rollers being suitably spaced apart so that the meal which passes therebetween is practically dry.

The treatment of the residual meal by steam or vapour in the conduit $x$ enables a very high percentage of the spirit to be recovered therefrom so that the plant is very economical. Inasmuch as it is unnecessary for the plant to stand idle whilst the meal is being soaked or drained and inasmuch as it is unnecessary to dig out the meal at the end of the process it follows that the time occupied and the labour involved in extracting the oil from a given quantity of seed or like vegetable matter are much less than with the usual methods, consequently the output is increased and the cost of operation is reduced.

The plant may comprise any number of tanks and associated parts as may be required according to the nature of the vegetable matter to be treated and by a suitable arrangement of valves and the like any desired tank and its associated parts may be made the last of the series.

By arranging the tanks $g^1$ and $g^3$ alongside one another at one side of the plant and the tanks $g^2$ and $g^4$ at the other side, the conduits $m^1$, $m^2$, $m^3$, and $m^4$ crossing, the length of the plant as a whole may be reduced.

I claim:—

1. An improved process for the extraction of oils from vegetable matter in the form of meal which consists in intimately mixing the meal and the spirit and in moving said meal and spirit continuously and in opposite directions, the speed of movement of both meal and spirit being temporarily retarded at predetermined points, at which the meal moves freely through the spirit without the employment of any separate container for said meal, submitting the meal to wringing action between said points before passing on to the next point, returning the mixture of spirit and oil to the point from which the meal has been removed, and submitting the meal after leaving the last wringing point to the action of vapour for removal of spirit therefrom.

2. In an improved process for the extraction of oils from vegetable matter, as claimed in claim 1, heating the meal prior to its introduction into the spirit and again during the final removal of the spirit therefrom.

3. Apparatus for the extraction of oils from vegetable matter in the form of meal, comprising a series of tanks each of which is divided into two parts by a screen of foraminous material, means for conducting the meal and the spirit to one side of the screen wringing apparatus, means for conveying the meal from each tank to said wringing apparatus, means for conducting the mixture of spirit and oil expressed from the meal by said wringing apparatus back to said tank, means for conducting the mixture of spirit and oil from one tank to another in the opposite direction to the movement of the meal, and from the last tank (with respect to the movement of said mixture) to an evaporator, means for conveying the meal from the last tank (with respect to the movement of said meal) to a chamber or the like wherein it is submitted to the action of vapour, and means for conducting the spirit-laden vapour to the condenser.

4. Apparatus as claimed in claim 3, wherein each screen is disposed obliquely in its tank, the meal and spirit inlets are arranged near the top of the tank above the screen, the meal and spirit outlets are arranged near the bottom of the tank the former above and the latter below the screen, and the conduit for returning the expressed spirit and oil to the tank is arranged near the bottom of the tank and beneath the screen.

5. Apparatus as claimed in claim 3, wherein the meal is conveyed away from each tank by means of endless scraper or like conveyors over screens of foraminous material, through which part of the mixture of spirit and oil drains off from the meal into a conduit before the meal is delivered to the wringing apparatus, the mixture expressed from the meal by said wringing apparatus being returned to the tank by the same conduit.

MATTHEW WHITEHEAD.